United States Patent
Kohler et al.

(10) Patent No.: US 6,285,933 B1
(45) Date of Patent: Sep. 4, 2001

(54) DEVICE AND METHOD FOR MONITORING A TRANSVERSE ACCELERATION SENSOR LOCATED IN A VEHICLE

(75) Inventors: Rolf Kohler, Schwieberdingen; Johannes Schmitt, Markgroeningen; Guenter Braun, Bietigheim; Andreas Zoebele, Markgroeningen; Matthias Kottmann, Wendlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/409,809

(22) Filed: Sep. 30, 1999

(30) Foreign Application Priority Data

Sep. 30, 1998 (DE) .................................................. 19844913

(51) Int. Cl.$^7$ ................................ G06F 19/00; B60T 8/32
(52) U.S. Cl. ........................ 701/34; 701/76; 303/122.05
(58) Field of Search ................................... 701/1, 29, 34, 701/76, 92; 702/96, 104, 141; 303/122, 122.05

(56) References Cited

U.S. PATENT DOCUMENTS

| | | | | |
|---|---|---|---|---|
| 4,928,242 | * | 5/1990 | Suzuki | 701/34 |
| 5,032,995 | * | 7/1991 | Matsuda et al. | 701/34 |
| 5,099,443 | * | 3/1992 | Higashimata et al. | 701/76 |
| 5,212,640 | * | 5/1993 | Matsuda | 701/34 |
| 5,343,396 | * | 8/1994 | Youngblood | 701/76 |
| 5,483,452 | * | 1/1996 | Tanaka | 701/76 |
| 5,729,476 | * | 3/1998 | Pfau | 701/76 |
| 5,842,143 | * | 11/1998 | Lohrenz et al. | 701/34 |
| 6,032,092 | * | 2/2000 | Laaser | 701/34 |
| 6,078,851 | * | 6/2000 | Sugitani | 701/34 |
| 6,144,904 | * | 11/2000 | Tseng | 701/34 |

FOREIGN PATENT DOCUMENTS

| | | |
|---|---|---|
| 39 30 302 | 5/1990 | (DE) . |
| 39 38 039 | 5/1991 | (DE) . |
| 42 30 295 | 3/1994 | (DE) . |
| 196 36 443 | 3/1998 | (DE) . |
| 0 751 888 | 5/1998 | (EP) . |
| 4 313062 | 11/1992 | (JP) . |
| 0 911 3535 | 5/1997 | (JP) . |

* cited by examiner

Primary Examiner—Gary Chin
(74) Attorney, Agent, or Firm—Kenyon & Kenyon

(57) ABSTRACT

A device for monitoring a transverse acceleration sensor located in a vehicle and detecting a first transverse acceleration quantity. The device includes a processing device that has at least one filtering device used to filter the first transverse acceleration quantity, yielding a filtered transverse acceleration quantity. A second transverse acceleration quantity is determined by determining device as a function of wheel speed quantities detected by a corresponding detecting device. A comparison between the filtered transverse acceleration quantity and the second transverse acceleration quantity is carried out in a monitoring device to monitor the transverse acceleration sensor.

15 Claims, 3 Drawing Sheets

DEVICE AND METHOD FOR MONITORING A TRANSVERSE ACCELERATION SENSOR LOCATED IN A VEHICLE

FIELD OF THE INVENTION

The present invention relates to a device and a method for monitoring a transverse acceleration sensor located in a vehicle.

BACKGROUND INFORMATION

Different variations of devices and methods for monitoring a sensor located in a vehicle are known.

A circuit arrangement for evaluating the signals from a yaw rate sensor is described in European Patent No. 0 751 888. For this purpose, the signals from the yaw rate sensor are supplied to a control unit. Signals from at least one sensor—in most cases, however, a plurality of sensors—which detects driving status-dependent quantities such as the steering wheel angle, wheel rotational speeds, transverse and longitudinal acceleration, etc. are also supplied to the control unit. Based on these signals, the control unit calculates a reference yaw rate and compares it to the yaw rate measured by a sensor. For this purpose, the difference between the reference yaw rate and the yaw rate measured by the yaw rate sensor is determined and compared to a preset threshold value. A status signal, which indicates whether the yaw rate sensor is in proper working order or is defective, is emitted, based on the result of this comparison. The reference yaw rate is determined as follows: using different mathematical models, various values for the yaw rate are determined on the basis of the further sensor signals. A reference yaw rate is determined by addition, based on these values, weighted by factors that are determined with the help of fuzzy logic. Determining the reference yaw rate using fuzzy logic involves a considerable amount of effort.

A device and a method for monitoring a yaw rate sensor, a transverse acceleration sensor, a steering angle sensor, and wheel speed sensors that are located in a vehicle are described in German Patent No. 196 36 443. Using mathematical models to which the sensor signal determined by the sensor is supplied, a yaw rate is determined for the yaw rate sensor, transverse acceleration sensor, steering angle sensor, and wheel speed sensors. A reference yaw rate is determined on the basis of these yaw rates determined for the different sensors. Using an inverted mathematical model for the various sensors, a sensor reference quantity is determined on the basis of this reference yaw rate. The individual sensors are monitored with the aid of this sensor reference quantity. This device and this method are used to simultaneously monitor multiple sensors provided in a vehicle. It is not possible, however, to monitor a single sensor.

A control device with an acceleration sensor and an error control unit for motor vehicles is described in German Patent No. 39 30 302. This control device includes a first acceleration sensor for detecting longitudinal accelerations and a second acceleration sensor, for example, for detecting transverse accelerations. The control device also includes a facility for recording the signals from the acceleration sensors and for deriving a data value on the basis of the two signals. The data value is compared to a preset comparison value in a further facility and an error in one of the sensor signals is detected. The data value is derived, for example, by adding up the acceleration signals or determined as the root of the sum of the squares of the acceleration signals. The use of a transverse acceleration quantity determined directly as a function of wheel speed quantities is not described.

SUMMARY OF THE INVENTION

An object of the present invention is to provide a device and a method for monitoring a transverse acceleration sensor located in a vehicle that can be used to monitor the transverse acceleration sensor with the least amount of effort, using a second transverse acceleration signal that is not determined by a transverse acceleration sensor.

The device according to the present invention concerns a device for monitoring a transverse acceleration sensor located in a vehicle and detecting a first transverse acceleration quantity that describes the transverse acceleration acting upon the vehicle. The device includes a determining means used to determine a second transverse acceleration quantity. A comparison between the first transverse acceleration quantity and the second transverse acceleration quantity is carried out in monitoring means to monitor the transverse acceleration sensor.

The transverse acceleration sensor is located in a vehicle that is equipped with an anti-skid system, i.e., an anti-skid braking system and/or a traction control system. Such anti-skid systems are equipped as standard with wheel speed sensors. To avoid the need for additional sensors, it can thus be advantageous to determine the second transverse acceleration quantity as a function of the quantities detected by the wheel speed sensors. For this reason, the device includes detecting means used to detect wheel speed quantities describing the speeds of the wheels. The second transverse acceleration quantity is determined in the determining means directly as a function of the wheel speed quantities.

According to a further advantage, the first transverse acceleration quantity is filtered before being supplied to the monitoring means. This filtering achieves two goals: first, it eliminates any noise that may exist in the first transverse acceleration quantity. Secondly, it suppresses components of the first transverse acceleration quantity that can be attributed to a rocking or vibrating motion of the vehicle structure. For this purpose, the device includes processing means that have at least one filtering means, in particular a low-pass filter. These processing means are used to filter the first transverse acceleration quantity, thus yielding a filtered transverse acceleration quantity.

In addition, it is advantageous to provide the processing means with further means for processing the first transverse acceleration quantity. These can be conversion means, for example, used to convert the first transverse acceleration quantity (which is an analog quantity) into a digital transverse acceleration quantity; and/or scaling means used to vary the resolution of the first transverse acceleration quantity; and/or correction means used to correct the zero position of the first transverse acceleration quantity; and/or first limiting means used to limit the maximum and minimum values of the first transverse acceleration quantity to physically reasonable values; and/or error response means; and/or second limiting means used to limit the increase in the first transverse acceleration quantity.

To detect the wheel speed quantities, the detecting means advantageously have wheel speed sensors, used to determine wheel rotational speed quantities, and conversion means, used to determine the wheel speed quantities as a function of the wheel rotational speed quantities.

Determining the second transverse acceleration quantity directly as a function of the wheel speed quantities of the non-driven wheels and of the vehicle track gauge has proven to be advantageous. Using the non-driven wheels ensures that the second transverse acceleration quantity is not corrupted by drive slippage.

According to the present invention, the second transverse acceleration quantity is determined as a function of a difference quantity and/or a mean quantity, both of which are determined as a function of the wheel speed quantities of the non-driven wheels. The difference quantity represents the difference between the wheel speed of the left and right non-driven wheels. The mean quantity describes the mean value of the wheel speeds of the left and right non-driven wheels.

It is advantageous to monitor the acceleration sensor only if at least one condition has been met. This avoids vehicle operating states that could corrupt the monitoring result. Monitoring is carried out if a quantity describing the vehicle speed exceeds a threshold value; and/or if no braking action has occurred; and/or if an anti-skid system provided in the vehicle, in particular an anti-skid braking system, is inactive; and/or if the wheel speed quantities have been corrected for at least some of the vehicle wheels; and/or if the filtered transverse acceleration quantity exceeds a threshold value; and/or if a system malfunction has not occurred. Monitoring the vehicle speed, braking action, and/or action of the anti-skid system ensures that the vehicle wheels continue to roll freely while the transverse acceleration sensor is being monitored. Monitoring the correction of the wheel speed quantities prevents the quantities from being corrupted during monitoring of the transverse acceleration sensor due to improperly corrected or varying wheel diameters. Monitoring the filtered transverse acceleration quantity ensures that the transverse acceleration sensor is monitored only if the latter emits a detectable signal or a detectable transverse acceleration quantity. Monitoring for a system malfunction prevents the transverse acceleration sensor from being monitored, for example when wheel speed sensors are defective.

It is advantageous to vary the value of a counter depending on the comparison and to determine whether the transverse acceleration sensor is defective on the basis of the counter value.

During comparison, it is advantageous to check the condition as to whether a deviation between the filtered transverse acceleration quantity and the second transverse acceleration quantity exceeds a threshold value for a preset period of time. For this purpose, the value of the counter is increased, for example by one, if the condition has been met. If the condition has not been met, on the other hand, the value of the counter is decreased, for example by 1.

The transverse acceleration sensor is defective if the counter value is greater than a threshold value. If the counter value is less than a threshold value, on the other hand, the transverse acceleration sensor is not defective. This procedure offers the following advantage: because the transverse acceleration sensor is evaluated on the basis of a counter, as far as its error susceptibility is concerned, the transverse acceleration sensor is not immediately determined to be defective if a one-time implausibility occurs. In order for the transverse acceleration sensor to be regarded as defective, the implausibility, expressed by the deviation between the filtered transverse acceleration quantity and the second transverse acceleration quantity, must continue for a certain period of time.

The comparison procedure advantageously takes into account the question of whether the second transverse acceleration quantity has completed a zero crossing. The comparison is not repeated until the second transverse acceleration quantity has completed a zero crossing. This measure ensures that the transverse acceleration sensor is not regarded as being defective based on a single driving situation, such as a left turn. A determination of whether the transverse acceleration sensor is defective must be made on the basis of many different consecutive driving situations.

If the transverse acceleration sensor is defective, the second transverse acceleration quantity is advantageously used instead of the first transverse acceleration quantity in a means which is provided in the vehicle to control or regulate at least one quantity describing the vehicle movement.

DETAILED DESCRIPTION

Figure 1:
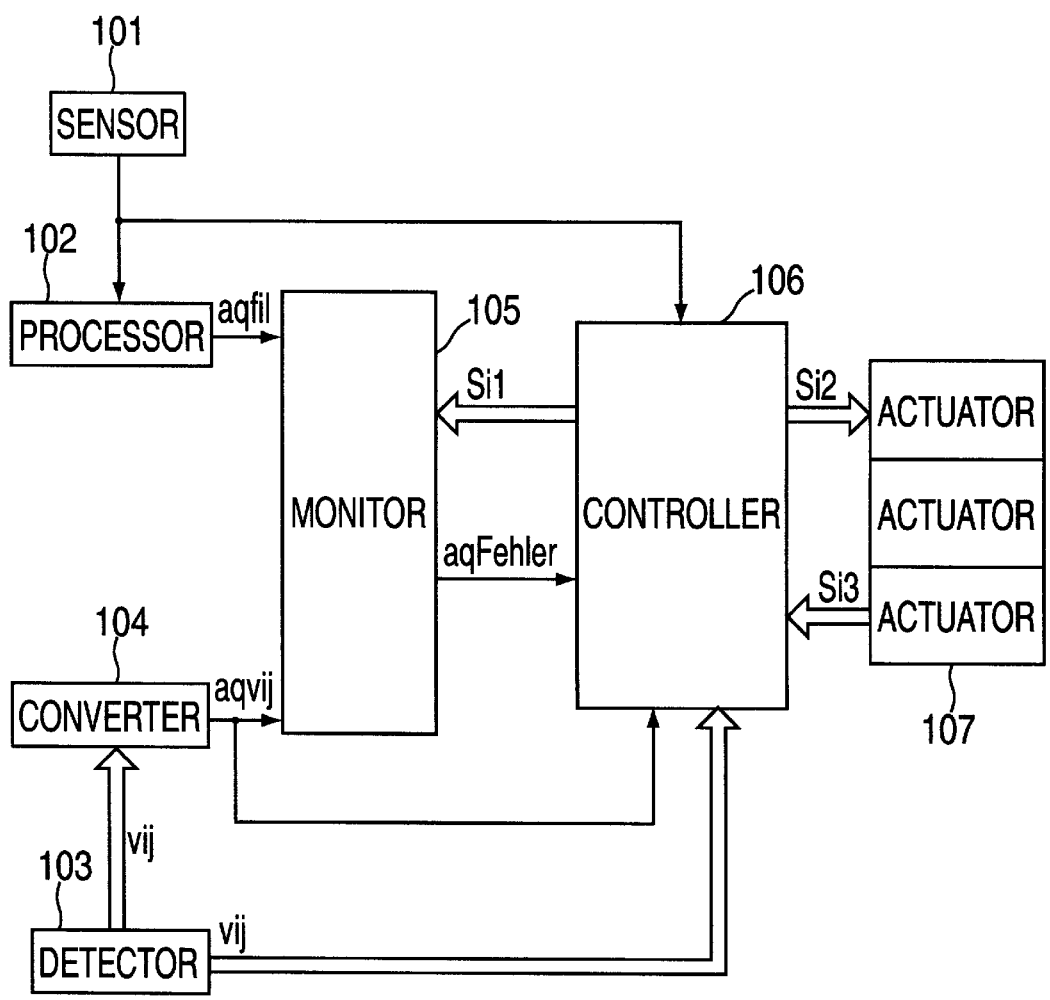
FIG. 1 illustrates a device according to the present invention for implementing a method according to the present invention.

The present invention is first described on the basis of FIG. 1.

Block 101 represents a transverse acceleration sensor used to detect a first transverse acceleration quantity that describes a transverse acceleration acting upon the vehicle. Transverse acceleration quantity aq is supplied to a block 102 and a block 106.

Figure 3:
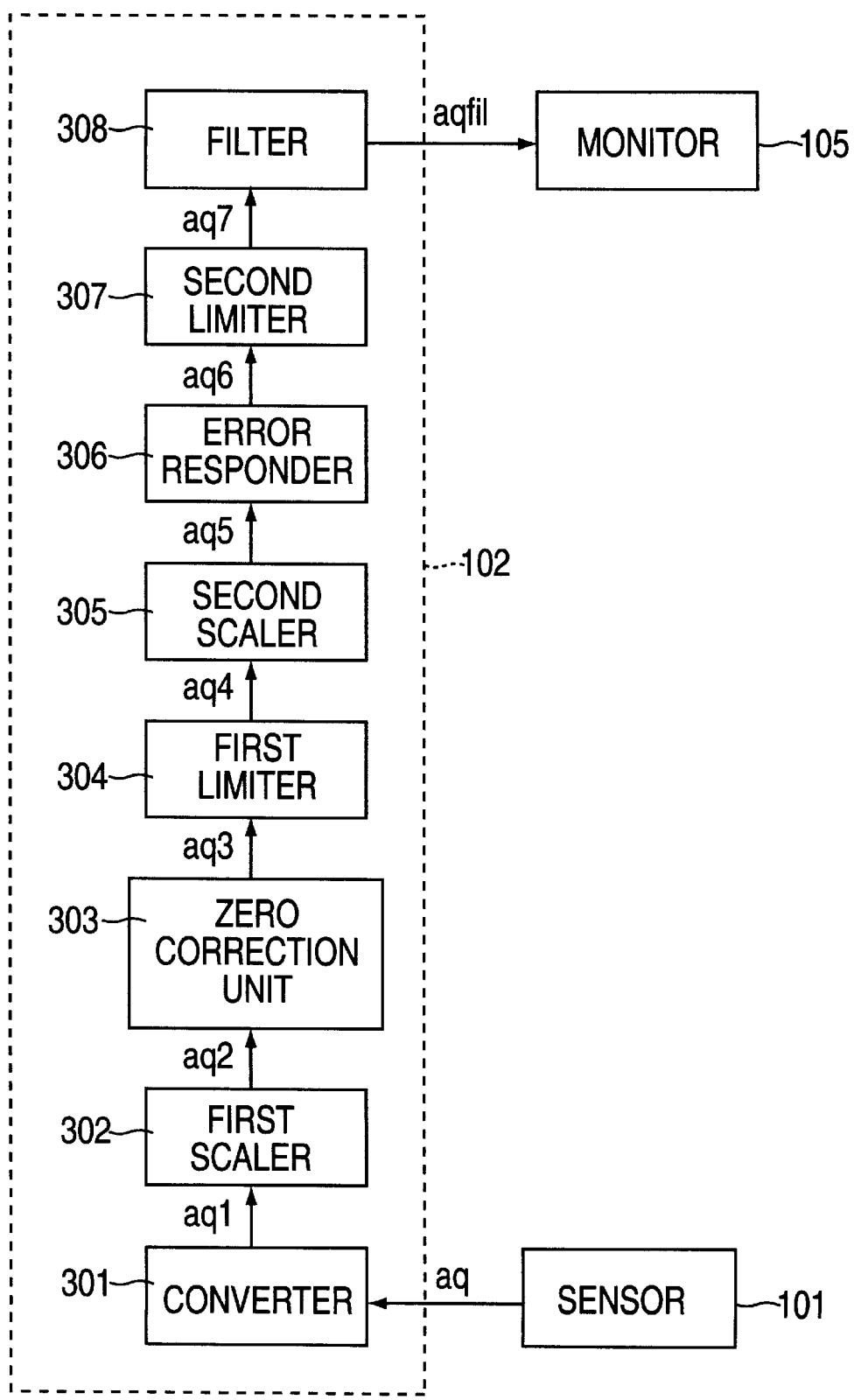
FIG. 3 illustrates a processing means of a device according to the present invention.

Block 102 represents processing means that include at least one filtering means, for example a low-pass filter. These processing means are used to filter first transverse acceleration quantity aq, thus yielding a filtered transverse acceleration quantity aqfil. Filtered transverse acceleration quantity aqfil is supplied from block 102 to a block 105. FIG. 3 illustrates the functions of processing means 102 in greater detail.

Block 103 represents detecting means used to detect wheel speed quantities vij describing the speeds of the wheels. Wheel speed quantities vij are supplied to a block 104 as well as block 106. The detecting means include wheel speed sensors, used to determine wheel rotational speed quantities, and conversion means, used to determine wheel speed quantities vij as a function of the wheel rotational speed quantities.

Index i indicates whether the wheel is a front wheel (v) or a rear wheel (h). Index j indicates whether the wheel is a right wheel (r) or a left wheel (l).

Block 104 represents a determining means used to determine a second transverse acceleration quantity aqvij directly as a function of wheel speed quantities vij. Second transverse acceleration quantity aqvij is supplied from block 104 to block 105 and block 106.

Designation aqvij used for the second transverse acceleration quantity demonstrates that the second transverse acceleration quantity is determined as a function of the wheel speed quantities. Neither index i nor index j has the meaning described in connection with wheel speed quantities vij.

The second transverse acceleration quantity can be determined, for example, using the following relation:

$$aqvij = deltav \times mittelv / \text{TRACK GAUGE}$$

Quantity deltav included in the above relation is determined as follows:

$$deltav = vvl - vvr$$

Quantity mittelv included in the above equation is determined as follows:

$$mittelv = 0.5 \times vvl + 0.5 \times vvr$$

In the vehicle on which the embodiment is based, the front wheels are the nondriven wheels. It is possible to determine aqvij in the same manner if the rear wheels are the non-driven wheels.

Block 105 represents monitoring means in which a comparison between filtered transverse acceleration quantity aqfil and second transverse acceleration quantity aqvij is carried out to monitor the transverse acceleration sensor. The result of this comparison is supplied from block 105 to block 106, using a pointer quantity aqFehler.

Block 106 represents a controller. This controller includes a control unit or regulator which is used to influence the transverse dynamics of the vehicle in the present embodiment. Wheel speed quantities vij and first transverse acceleration quantity aq are both supplied to controller 106 to detect the vehicle situation. To influence the transverse dynamics of the vehicle, controller 106 emits signals or quantities Si2 which are supplied to a block 107 representing actuators located in the vehicle. These are actuators used to influence the engine or the engine torque produced by the engine. Depending on whether the engine is a spark-ignition or a Diesel engine, this can be done by influencing the throttle angle, ignition point (ignition angle), amount of fuel supplied, or charging pressure. In addition, it is possible to manipulate the coupling used to transmit force between the engine and driving wheels or to manipulate the gear train. One conceivable way to manipulate the gear train, for example, to switch to a higher gear, thus reducing the driving torque. Manipulation of the vehicle brakes is also possible. Influencing the driving torque can limit, reduce, or increase the driving torque.

The manipulations described above influence vehicle stability within a limit range, thus supporting the driver in critical driving situations. This increases vehicle steerability during forward motion, and the vehicle is therefore less likely to be understeered.

Quantities or signals Si3, which indicate the status of the various actuators and are used for regulation or control purposes, are supplied to controller 106 from actuators 107.

While monitoring the transverse acceleration sensor, block 104 is used to check whether different conditions are met. Only if these conditions are met is the transverse acceleration sensor monitored. To check whether the conditions have been met, quantities or signals Si1 are supplied from block 106 to block 105. These quantities or signals Si1 include, for example, a quantity describing the vehicle speed; a quantity describing the braking action; a quantity indicating whether an anti-skid system located in the vehicle is active; a quantity indicating whether the wheel speed quantities were corrected for at least some of the vehicle wheels; and a quantity indicating whether a system malfunction has occurred. The transverse acceleration sensor is monitored if a quantity describing the vehicle speed exceeds the threshold value; and/or if no braking action has occurred; and/or if an anti-skid system provided in the vehicle, for example an anti-skid braking system, is inactive; and/or if the wheel speed quantities have been corrected for at least some of the vehicle wheels; and/or if filtered transverse acceleration quantity aqfil exceeds a threshold value; and/or if a system malfunction has not occurred.

With regard to the problem on which the correction of the wheel speed quantities is based, reference is made to German Patent No. 42 30 295, which describes a device and a method for a tire tolerance synchronization procedure on which a correction of the wheel speed quantities is based.

In determining the second transverse acceleration quantity, it is advantageous to use a correction quantity that represents the inclined motion of the non-driven wheels.

Figure 2:
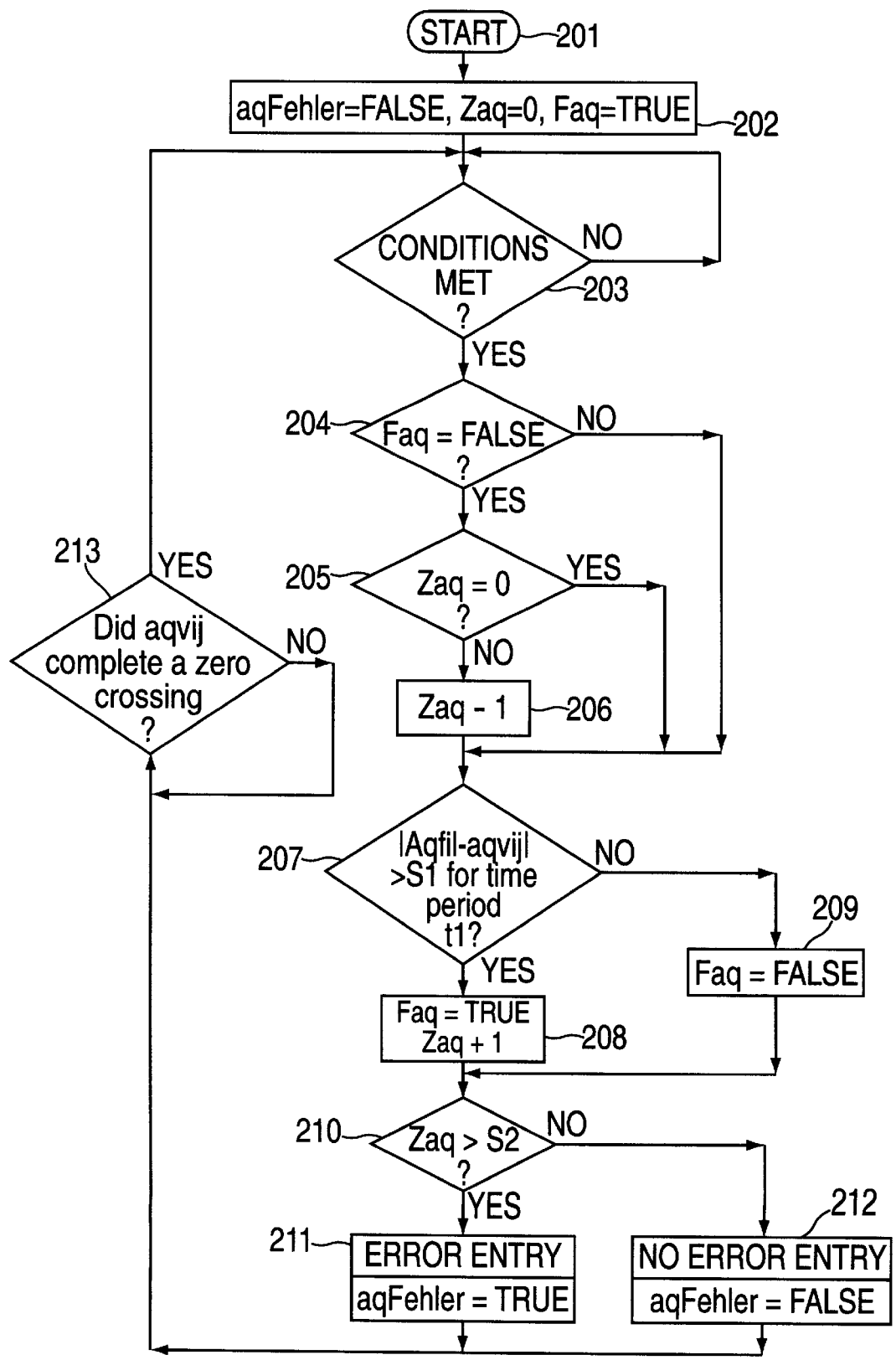
FIG. 2 illustrates a flowchart of an embodiment for implementing a method according to the present invention.

FIG. 2, which shows the sequences of steps in the method according to the present invention on the basis of a flowchart, is described below.

The method according to the present invention begins with a step 201, which is followed by a step 202. At the beginning of the method according to the present invention, quantities that are used in the method according to the present invention, are assigned predefined values in step 202. These quantities include a counter Zaq, which represents a timer, as described below. Counter Zaq is assigned value 0. There is also a pointer quantity aqFehler, which is used to indicate whether the transverse acceleration sensor is defective. Pointer quantity aqFehler is assigned value FALSE. There is also a pointer Faq, which is used to indicate whether or not the condition checked in step 207 has been met. Pointer Faq is assigned value TRUE. Step 202 is followed by a step 203. Step 203 checks whether the conditions have been met. This ensures that the transverse acceleration sensor is not monitored in vehicle driving states which could cause the transverse acceleration sensor to be incorrectly monitored. If the conditions are not met, step 203 is carried out again. If the conditions are met, however, step 202 is followed by a step 204.

Step 204 checks whether pointer Faq was assigned value FALSE. If step 204 determines that pointer Faq does not have value FALSE, meaning that the condition checked in step 207 was met in the previous comparison cycle, step 204 is followed by step 207. If, however, step 204 determines that pointer Faq was assigned value FALSE, meaning that the condition checked in step 207 was not met in the previous comparison cycle, step 204 is followed by a step 205.

Step 205 checks whether pointer Zaq was assigned value 0. If step 205 determines that pointer Zaq has value 0, step 205 is followed by step 207. If, however, step 205 determines that pointer Zaq does not have value 0, step 205 is followed by a step 206. The purpose of the query performed in step 205 is to prevent counter Zaq from assuming negative values. In step 206, counter Zaq is decreased by 1. Step 206 is followed by step 207.

Step 207 checks the condition of whether a deviation between filtered transverse acceleration quantity aqfil and second transverse acceleration quantity aqvij exceeds a threshold value S1 for a preset period of time t1. The deviation is an absolute value showing the difference between the two quantities. This condition has the following technical background: if the transverse acceleration sensor is not defective, both the filtered transverse acceleration quantity, which is based on the first transverse acceleration quantity, and the second transverse acceleration quantity, which is determined directly as a function of the wheel speed quantities, must lie within the same value range. Ideally both the filtered transverse acceleration quantity and the second transverse acceleration quantity should be identical. However, minor differences usually occur which are taken into account by using a threshold value S1 other than 0.

If step 207 determines that the condition has been met, step 207 is followed by a step 208 in which value TRUE is assigned to pointer Faq. At the same time, counter Zaq is increased by 1 in step 208. If, however, step 207 determines that the condition has not been met, step 207 is followed by a step 209 in which value FALSE is assigned to pointer Faq.

Due to this value assignment, counter Zaq is decreased by 1 in the subsequent comparison cycle, using step sequence 204, 205, and 206. Step 209 is followed by step 210.

Step 210 compares the value of counter Zaq to a threshold value S2. If step 210 determines that the value of counter Zaq is greater than threshold value S2, step 210 is followed by a step 211 in which an error entry is made. For this purpose, pointer quantity aqFehler is assigned value TRUE. Step 211 is followed by step 213.

If, however, step 210 determines that the value of counter Zaq is less than threshold value S2, step 210 is followed by a step 212. In this step, an error entry is not made, i.e., pointer quantity aqFehler is assigned value FALSE. Step 212 is also followed by step 213.

Step 213 checks whether second transverse acceleration quantity aqvij has completed a zero crossing. This check is carried out for the following reason: the transverse acceleration sensor should not be determined to be defective solely on the basis of a sustained driving maneuver, for example a long turn. It must be ensured that the transverse acceleration sensor is determined to be defective on the basis of a plurality of different vehicle maneuvers. If step 213 determines that second transverse acceleration quantity aqvij did not complete a zero crossing, step 213 is repeated. If, however, step 213 determines that second transverse acceleration quantity aqvij did complete a zero crossing, step 213 is followed by step 203.

FIG. 3, in which processing means 102 is explained in detail, is described below.

Transverse acceleration sensor 101 is used to determine transverse acceleration quantity aq, which is supplied to a block 301. Block 301 represents conversion means used to convert transverse acceleration quantity aq (which is an analog quantity) into a digital transverse acceleration quantity aq1. Quantity aq1 is supplied to a block 302. Block 302 represents first scaling means used to vary the resolution of quantity aq1. Resulting quantity aq2 is supplied to a block 303. Block 303 represents correction means used to correct the zero position of quantity aq2. Resulting quantity aq3 is supplied to a block 304. 304 designates first limiting means used to limit the maximum and minimum values of quantity aq3 to physically reasonable values. Limited signal aq4 is supplied to a block 305. Block 305 represents second scaling means used to vary the resolution of quantity aq4. Resulting quantity aq5 is supplied to a block 306. Block 306 represents error response means. If certain errors have occurred, block 306 outputs predefined quantities aq6. However, if these errors have not occurred, quantity aq6 is identical to quantity aq5. Quantity aq6 is supplied to a block 307. Block 307 represents second limiting means. These second limiting means are used to limit the increase in quantity aq6. Resulting quantity aq7 is supplied to a block 308, which represents filtering means. These filtering means can be, for example, a low-pass filter. Block 308 is used to filter quantity aq7, thus yielding a filtered quantity aqfil. Filtered transverse acceleration aqfil is supplied to block 105.

At this point, note that different embodiments are conceivable for processing means 102. For example, processing means 102 can include all components 301 to 308. Alternatively, processing means 102 can include any subset of components 301 to 308.

In conclusion, note that the specific embodiment selected in the description and the representation selected in the figures are in no way intended to limit the main idea behind the present invention.

What is claimed is:

1. A device for monitoring a transverse acceleration sensor, located in a vehicle, which detects a first transverse acceleration quantity that describes a transverse acceleration acting upon the vehicle, comprising:
    a processing device including at least one filter, the at least one filter filtering the first transverse acceleration quantity, the at least one filter providing a filtered transverse acceleration quantity;
    a detecting device detecting wheel speed quantities, the wheel speed quantities describing at least one speed of at least one wheel of the vehicle;
    a determining device determining a second transverse acceleration quantity directly as a function of the wheel speed quantities; and
    a monitoring device monitoring the transverse acceleration sensor by performing a comparison of the filtered transverse acceleration quantity and the second transverse acceleration quantity.

2. The device according to claim 1, wherein the filter is a low-pass filter.

3. The device according to claim 1, wherein the second transverse acceleration quantity is determined as a function of the wheel speed quantities of non-driven wheels and a vehicle track gauge, and the detecting device includes wheel speed sensors and a conversion device, the wheel speed sensors determining wheel rotational speed quantities, the conversion device determining the wheel speed quantities as a function of the wheel rotational speed quantities.

4. The device according to claim 3, wherein at least one of a difference quantity and a mean quantity are determined as a function of the wheel speed quantities of the non-driven wheels, and the second transverse acceleration quantity is determined as a function of at least one of the difference quantity and the mean quantity, the difference quantity describing a difference between a first wheel speed of a left wheel of the non-driven wheels and a second wheel speed of a right wheel of the non-driven wheels, the mean quantity describing a mean value of the first wheel speed of the left wheel of the non-driven wheels and the second wheel speed of the right wheel of the non-driven wheels.

5. The device according to claim 1, wherein the transverse acceleration sensor is monitored only if at least one condition exists.

6. The device according to claim 5, wherein the at least one condition includes at least one of:
    a quantity describing a vehicle speed exceeds a first threshold value,
    a braking action has not occurred,
    an anti-skid system of the vehicle is inactive,
    the wheel speed quantities have been corrected for at least one wheel,
    the filtered transverse acceleration quantity exceeds a second threshold value, and
    a system malfunction has not occurred.

7. The device according to claim 1, further comprising:
    a counter, a value of the counter being varied based on the comparison, the value of the counter determining whether the transverse acceleration sensor is defective.

8. The device according to claim 7, wherein the transverse acceleration sensor is defective when the value of the counter is greater than a third threshold value, and the transverse acceleration sensor is not defective when the value of the counter is less than the third threshold value.

9. The device according to claim 7, wherein when the transverse acceleration sensor is defective the second transverse acceleration quantity is used instead of the first transverse acceleration quantity in a controller, the controller regulating at least one quantity describing a movement of the vehicle.

10. The device according to claim 1, wherein during the comparison a determination is made as to whether a deviation between the filtered transverse acceleration quantity and the second transverse acceleration quantity exceeds a fourth threshold value for a preset period of time.

11. The device according to claim 10, wherein a value of a counter is increased by an amount when the deviation exceeds the fourth threshold value for the preset period of time, and the value of the counter is decreased by the amount when the deviation does not exceed the fourth threshold value for the preset period of time.

12. The device according to claim 11, where in the amount is equal to one.

13. The device according to claim 1, wherein the comparison takes into account whether the second transverse acceleration quantity has completed a zero crossing, and the comparison is not repeated until the second transverse acceleration quantity has completed the zero crossing.

14. The device according to claim 1, wherein the processing device further includes at least one of:

- a conversion device converting the first transverse acceleration quantity into a digital tr ansverse acceleration quantity;
- a scaling device varying a resolution of the first transverse acceleration quantity;
- a correction device correcting a zero position of the first transverse acceleration quantity;
- a first limiting device limiting a maximum value and a minimum value of the first transverse acceleration quantity to physically reasonable values;
- an error response device; and
- a second limiting device limiting an increase in the first transverse acceleration quantity.

15. A method for monitoring a transverse acceleration sensor in a vehicle, comprising the steps of:

- detecting a first transverse acceleration quantity via the transverse acceleration sensor, the first transverse acceleration quantity describing a transverse acceleration acting upon the vehicle;
- filtering the first transverse acceleration quantity via a processing device, the processing device including at least one filtering device, the processing device providing a filtered transverse acceleration quantity;
- detecting wheel speed quantities describing speeds of wheels of the vehicle;
- determining a second transverse acceleration quantity directly as a function of the wheel speed quantities; and
- monitoring the transverse acceleration sensor by comparing the filtered transverse acceleration quantity and the second transverse acceleration quantity.

* * * * *